July 2, 1957  B. W. HOTTEN  2,798,087
PREPARATION OF MONOESTER TEREPHTHALAMATES
Filed June 28, 1954
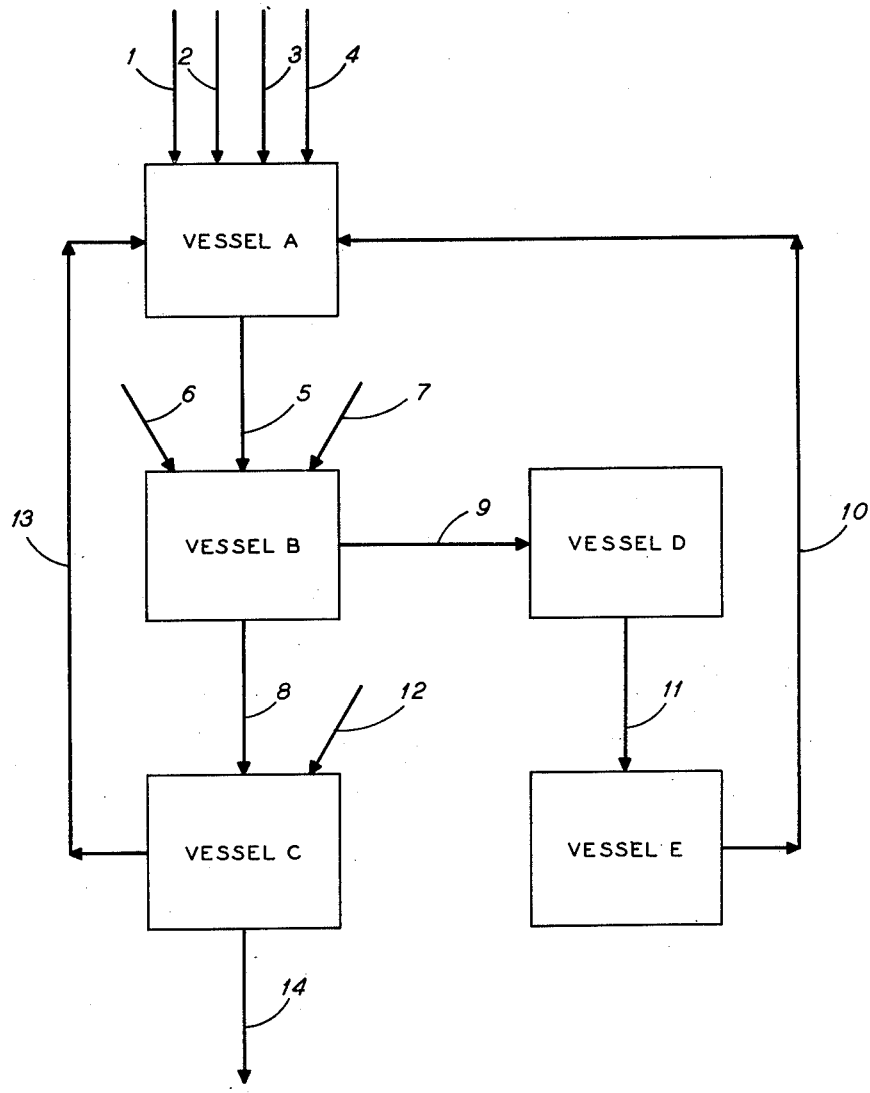
INVENTOR
BRUCE W. HOTTEN
BY
ATTORNEY
AGENT

2,798,087

PREPARATION OF MONOESTER TEREPHTHALAMATES

Bruce W. Hotten, Orinda, Calif., assignor to California Research Corporation, San Francisco, Calif., a corporation of Delaware Application June 28, 1954, Serial No. 439,931

6 Claims. (Cl. 260—471)

The present invention is directed to a process of preparing monoesters of terephthalamic acids from monoesters of terephthalic acids.

Monoesters of terephthalamic acids are particularly useful in the preparation of grease-thickening agents. As described in Hotten patent application Serial No. 401,697, filed December 31, 1953 (now abandoned), metal salts of terephthalamic acids thicken lubricating oils to form extremely high melting point grease compositions having excellent resistance to emulsification in water.

Whereas the process of the present invention involves only one step, known processes require the utilization of two separate reactions. For example, monoesters of terephthalamic acids have previously been prepared by first reacting a monoester of terephthalic acid with thionyl chloride to form the monoester of terephthaloyl chloride. Before this chloride can be used in subsequent reactions with amines to form the terephthalamates, it is necessary to recover the chloride from this reaction mixture. According to the process of this invention, this chloride recovery step is eliminated.

In addition to the utilization of fewer steps in the present process, it is also less costly than former processes. Furthermore, the terephthalamate obtained according to the present process is of greater purity than that obtained in the 2-step process. Still further, whereas the reactants of prior processes utilizing thionyl chloride are extremely corrosive to metal equipment, the reactants of the present process are relatively noncorrosive.

Therefore, it is a primary object of the present invention to set forth a process whereby monoesters of terephthalamic acids are obtained relatively pure, without the necessity of a time-consuming purification process.

According to the present invention, monoesters of terephthalamic acids are prepared by treating an admixture of a monoester of terephthalic acid (or a metal salt thereof), a primary amine, and a tertiary amine with a phosphorus halide or a phosphorus oxyhalide.

The general equations for the over-all reactions of this process are as follows (wherein Y represents a halogen, R represents an ester radical, R' represents a primary amine radical, R'' represents a tertiary amine radical, and X represents a metal or a salt-forming group). Equation 1 illustrates the reaction which takes place when a monoester of terephthalic acid is used as the reactant, and Equation 2 illustrates the reaction which takes place when a salt of a monoester of terephthalic acid is used as a reactant.

(1)
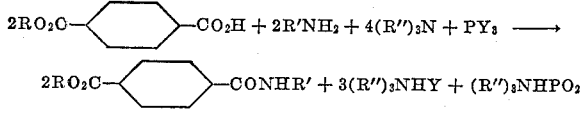

(2)
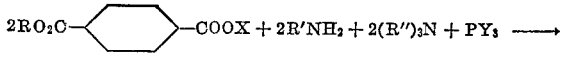

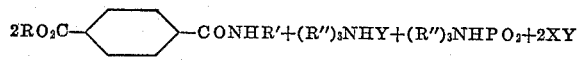

The particular mechanism by which the ester of terephthalamic acid is formed according to this process is not known. However, it is surprising that the desired product can be obtained by this process mixture, because it is known that phosphorus halides (e. g., phosphorus trichloride) and tertiary amines (e. g., triethylamine) form addition compounds when they are in contact of themselves. Thus, it would be expected that this addition compound would form and prevent the desired reaction from taking place.

The tertiary amine serves not only as a catalyst in promoting the desired reaction, but it also serves as a solvent for the reactants. The reaction set forth in this invention proceeds readily by adding a phosphorus halide to a blend consisting of a monoester of terephthalic acid, a primary amine and a tertiary amine. The reaction seems to proceed more readily in an environment wherein the reactants are not too concentrated. The preferred method of the invention is accomplished by forming an admixture of a monoester of terephthalic acid (or a monoester of a metal salt of terephthalic acid), a primary amine, a tertiary amine, and a hydrocarbon which serves as a secondary solvent; after which a phosphorus halide compound is slowly incorporated into the admixture.

The ester radicals of the monoesters of terephthalic acid are straight-chain or branched-chain, saturated or unsaturated hydrocarbon radicals containing from 1 to 12 carbon atoms. Examples of ester radicals include the radicals derived from the following alcohols: methyl alcohol, ethyl alcohol, isopropyl alcohol, propyl alcohol, butyl alcohol, isobutyl alcohol, tertiary butyl alcohol, amyl alcohol, isoamyl alcohol, hexyl alcohol, heptyl alcohol, octyl alcohol, lauryl alcohol, etc.

The primary amines used in the present process contain straight-chain or branched-chain, saturated or unsaturated hydrocarbon radicals having from 1 to 22 or more carbon atoms. These primary amines include aliphatic and aromatic primary amines exemplified by methylamine, ethylamine, butylamine, hexylamine, octylamine, decylamine, dodecylamine, tetradecylamine, hexadecylamine, octadecylamine, eicosylamine, docosylamine, aniline, etc.

The tertiary amines contain aryl or alkyl radicals having no more than 12 carbon atoms. Examples of tertiary amines include trimethylamine, triethylamine, tripropylamine, tributylamine, tridecylamine, dimethylaniline, diethylaniline, dipropylaniline, etc.

When salts of the monoesters of terephthalic acid are used as reactants, the metals and salt-forming groups include the metals of groups I, II, III, and IV of Mendeleef's Periodic Table, preferably the metals of group I (e. g., sodium and potassium), ammonium, nitrogen bases, etc.

The phosphorus halides which can be used include phosphorus trichloride, phosphorus pentachloride, phosphorus oxychloride, phosphorus tribromide, phosphorus pentabromide, phosphorus oxybromide, phosphorus trifluoride, etc.

The hydrocarbon solvents which can be used herein include aromatic and aliphatic hydrocarbon solvents, such as benzene, toluene, xylene, heptane, octane, decane, dodecane, petroleum lubricating oil (e. g., naphthenic or paraffin base lubricating oils), etc., and non-reactive solvents, such as esters and ethers (e. g., esters of sebacic acid, isopropyl ether, etc.). It is a requisite of the solvent that the reactants form a continuous phase, that is, are solubilized in the solvent, while the reaction product, that is, the monoesters of terephthalamic acid (or the salt thereof) are preferably insoluble in the solvent to precipitate out of solution as the solvent is cooled.

When the monoester of terephthalamic acid is to be recovered as the compound per se, it is preferred to use a solvent from which the compound readily precipitates as the solvent is cooled, or a solvent which is readily removed from the compound by distillation. On the other hand, if the terephthalamate is to be retained in the solvent for such purpose as for grease preparation, it is preferred to use a petroleum oil as the solvent.

Examples of monoesters of terephthalic acids (or the metal salts thereof) include monomethyl ester of terephthalic acid, monoethyl ester of terephthalic acid, monopropyl ester of terephthalic acid, monobutyl ester of terephthalic acid, monooctyl ester of terephthalic acid, monodecyl ester of terephthalic acid, sodium monomethylterephthalate, sodium monoethylterephthalate, sodium monobutylterephthalate, sodium monohexylterephthalate, potassium monooctylterephthalate, potassium monodecylterephthalate, potassium monododecylterephthalate, etc.

In the preparation of monoesters of terephthalamic acids according to the process of the present invention, a mixture comprising about one mole of an alkyl ester of terephthalic acid, about one mole of an alkylamine, from about 1 to 4 moles of a trialkylamine, and from 0 to about 10 volumes or more of a hydrocarbon solvent (based on the volume of trialkylamine) is heated to a temperature sufficient to form a homogeneous solution (e. g., from about 45° C. to about 150° C., after which the solution is cooled to temperatures below the boiling point of the phosphorus halide, which is slowly added in amounts of 0.25 to 4 moles per mole of terephthalic acid ester. The reaction mixture is then heated for a period of time ranging from about 1 to about 8 hours at temperatures from about 100° C. to 200° C. (preferably 125° C. to 175° C.). The mixture is cooled to temperatures of about 70° C. to 95° C., and it is water washed at that temperature until the water washes are substantially negative to the halide ion test. (When the monoesters of terephthalic acid are used, the reaction time is from about 1 to 3 hours; however, when the salts of the monoesters of terephthalic acid are used, the reaction time may be as long as 8 hours.) The water layer is separated from the oil layer, which is then cooled to precipitate out the terephthalamate, or heated to remove the solvent. The solvent is recovered and recycled to the reaction vessel for use in subsequent preparations of terephthalamates. The water washings may be treated with a basic substance (e. g., sodium hydroxide) to recover the tertiary amine, which can also be recycled to the reaction vessel for subsequent terephthalamate preparations.

In the preferred embodiment of the invention, about 1 mole of an alkyl ester of terephthalic acid, about 1 mole of an alkylamine, and about 2 moles of a trialkylamine are incorporated in a hydrocarbon solvent, more preferably a mononuclear aromatic hydrocarbon solvent (e. g., toluene), the volume of which solvent is about equal to the volume of trialkylamine used. This solution is then heated to a temperature of about 65° C. to form a clear solution, then cooled to about room temperature, after which about 0.5 mole of phosphorus trichloride is slowly added. The whole mixture is heated at reflux temperature from 1 to 8 hours, that is, for a time sufficient to form the monoester of terephthalamic acid. The mixture is water washed at temperatures sufficient to keep the terephthalamate in solution, preferably 70 to 95° C. When the solvent layer is cooled, the product precipitates from solution, and this precipitate is recovered by filtration, washed with ether, and dried. The terephthalamate thus prepared is relatively pure. If desirable, rather than recover the terephthalamate by filtration, the solvent can be removed by distillation.

In the accompanying drawing, which forms a part of this specification, there is shown diagrammatically the preferred embodiment of the invention.

The single figure of the drawing graphically portrays the steps utilized in the process of this invention. The hydrocarbon solvent, the ester of terephthalic acid, the primary amine, and tertiary amine are charged to vessel A through lines 1, 2, 3, and 4, respectively. With thorough agitation, this vessel is heated to a temperature sufficient to form a homogeneous solution; that is, temperatures ranging from about 50° C. to about 150° C. The mixture is then pumped to vessel B through line 5, where it is cooled to about room temperature, after which phosphorus trichloride is slowly added to vessel B through line 6. The reaction mixture in vessel B is heated with constant agitation to temperatures ranging from 100° C. to 200° C., preferably from 125° C. to 175° C. and maintained at reflux temperature for a period ranging from 1 to 8 hours.

Water is then added to vessel B through line 7, and the mixture is thoroughly washed with water to remove the water-soluble tertiary amine phosphite and the tertiary amine hydrochloride. After the solution has been washed sufficiently to give a negative chloride ion test in the water wash, the water phase and the oil phase are allowed to separate. The water phase is pumped into vessel C through line 8, and the warm oil-soluble phase is pumped into vessel D through line 9, where it is cooled to precipitate out the monoester of terephthalamic acid (which is insoluble in the hydrocarbon solvent at room temperature). The monoester of terephthalamic acid is filtered from the solvent, which flows to vessel E through line 11. The separated solvent is then recycled to vessel A through line 10, and the monoester of terephthalamic acid is recovered from vessel D. A basic substance (e. g., sodium hydroxide) is added through line 12 to the water-soluble components in vessel C to recover the tertiary amine, which is recycled to vessel A through line 13. The residue is discarded through line 14.

In the procedure described hereinabove with reference to the drawing, the several steps have been shown as carried out in separate pieces of equipment. However, modifications will be apparent to one skilled in the art. For example, two or more steps may be carried out in the same reaction vessel. During the water-washing step of the process, an emulsion may form. However, this may be avoided by the addition of an emulsion inhibitor (e. g., a silicone), by the addition of more solvent, by slightly increased heating, or by other means.

The following specific examples will further serve to illustrate the practices and advantages of this invention.

*Example 1.—Preparation of N-"octadecyl"-monomethyl terephthalamate*

180 grams (1 mole) of monomethyl terephthalate, 300 grams (1 mole) of "octadecyl"amine, 300 ml. (2.16 moles) of triethylamine, and 500 ml. of toluene were charged to a glass resin flask. The whole mixture was heated with agitation to 45° C. to form a solution, after which 44 ml. (0.5 mole) of phosphorus trichloride was added dropwise over a period of 30 minutes at temperatures ranging from 45° C. to 60° C. The whole mixture was then heated at reflux temperature (115° C.) for a period of 2.5 hours, after which the mixture was cooled slightly and 2 liters of toluene were added. The mixture was washed with water at temperatures at about 65° C. to about 95° C. until the water was negative to the chloride ion test. After the separation of the toluene layer from the water layer, the toluene solution was cooled to room temperature to precipitate out the monomethyl-N-"octadecyl" terephthalamate. The precipitate was recovered and washed with diethyl ether and dried. The saponification number (mgs. KOH per gram of product) of the product was 441. (The theoretical value is 440.) A 78% of theoretical yield was obtained. Further quantities of the product can be recovered by working up the water washings.

The "octadecyl"amine used herein was a commercial preparation of amines known as "Armeen HT," sold by the Armour Company, Chicago, Illinois, and containing 25% hexadecylamine, 70% octadecylamine, and 5% octadecenylamine. 85% of this mixture consists of N-primary amines.

*Example 2.—Preparation of N-"octadecyl"-monomethyl terephthalamate*

3880 grams (21.6 moles) of monomethyl terephthalate, 6000 grams (20 moles) of "octadecyl"amine, 4157 grams (41.2 moles) of triethylamine, and 6000 grams of toluene were charged to an iron vessel and heated, with agitation, to temperatures in the range of 65° C. to 100° C. until a solution was obtained. The mixture was cooled to about 40° C., and 1400 grams (10.2 moles) of phosphorus trichloride were added slowly during a period of 45 minutes. The temperature of the mixture was increased to reflux temperature and maintained at that temperature for 2.5 hours, after which the mixture was cooled to 90° C. and washed with hot water until the water washings were negative to the chloride ion test. The toluene was removed by distillation, leaving a light tan solid as the product. The saponification number of this crude product was 500.

*Example 3.—Preparation of N-"octadecyl"-monomethyl terephthalamate*

229 grams (1 mole) of potassium methyl terephthalate, 300 grams (1 mole) of "octadecyl"amine, 111 grams (1.1 moles) of triethylamine, and 750 ml. of xylene were charged to a glass resin flask and heated to 80° C. until complete solution for the reactants in the triethylamine and xylene was obtained. The mixture was cooled to 40° C., at which temperature the mixture was a smooth soft paste. 48 ml. (0.55 mole) of phosphorus trichloride was added dropwise, over a period of 25 minutes, during which time the temperature was maintained below 60° C. After the addition of the phosphorus trichloride, the temperature was increased to 140° C. (reflux temperature) and maintained at that temperature for 6 hours, after which the reaction mixture was washed alternately with water, aqueous acetic acid solutions, and triethylamine solutions. The xylene solution was cooled, and methyl-N-"octadecyl"terephthalamate was separated from the xylene by filtration. The product thus recovered had a saponification number of 455. The yield was 88% of theory.

While the above specific examples and detailed description of the invention set forth the preferred embodiments of the invention, still other embodiments and variants are within the scope of this invention.

I claim:

1. The process of preparing monoesters of terephthalamic acid comprising forming a solution of a terephthalic acid derivative and a primary amine in a tertiary amine, heating said admixture to a temperature sufficient to form a homogeneous solution, followed by cooling of said solution to a temperature below the boiling point of phosphorus chloride, adding phosphorus chloride in an amount from 0.25 mole to 4 moles per mole of said terephthalic acid derivative, heating the resulting mixture to a temperature ranging from 100° C. to about 200° C., after which the mixture is cooled and the desired monoester of terephthalamic acid is recovered, said terephthalic acid derivative being selected from the group consisting of monoesters of terephthalic acid and salts of monoesters of terephthalic acid.

2. The process of preparing monoesters of terephthalamic acid comprising forming an admixture of a terephthalic acid derivative, a primary amine, a tertiary amine, and a hydrocarbon solvent, heating said admixture to a temperature sufficient to form a homogeneous solution, followed by cooling of said solution to a temperature below the boiling point of phosphorus chloride, adding phosphorus chloride in an amount from 0.25 mole to 4 moles per mole of said terephthalic acid derivative, heating the resulting mixture to a temperature ranging from 100° C. to about 200° C., after which the mixture is cooled and the desired monoester of terephthalamic acid is recovered, said terephthalic acid being selected from the group consisting of monoesters of terephthalic acid and salts of monoesters of terephthalic acid.

3. The process of preparing monoesters of terephthalamic acid comprising reacting a terephthalic acid derivative, a primary amine, and a phosphorus chloride in a solvent consisting essentially of a tertiary amine and a mononuclear aromatic hydrocarbon solvent at temperatures from about 45° C. to about 150° C. for a time sufficient to form said terephthalamic acid ester, water washing said reaction mixture at a temperature sufficient to keep said terephthalamic acid soluble in said mononuclear aromatic hydrocarbon solvent, and recovering said monoester of terephthalamic acid, said terephthalic acid derivative being selected from the group consisting of monoesters of terephthalic acid and salts of monoesters of terephthalic acid.

4. The process of preparing monoesters of terephthalamic acid comprising forming an admixture of a terephthalic acid derivative, a primary amine, a tertiary amine, and a mononuclear aromatic hydrocarbon, heating said admixture to a temperature sufficient to form a homogeneous solution, followed by cooling said solution to a temperature below the boiling point of phosphorus chloride, adding a phosphorus chloride at temperatures ranging from 100° C. to 200° C., maintaining that temperature range until the reaction is substantially complete, adding water to the whole reaction mixture, washing said reaction mixture at temperatures sufficient to keep the terephthalamate in solution until the water washings are substantially negative to the halide ion test, and cooling the remaining oil-soluble phase sufficiently to precipitate out the product, said terephthalic acid derivative being selected from the group consisting of monoesters of terephthalic acid and salts of monoesters of terephthalic acid.

5. The process of claim 4, wherein said tertiary amine is a tri-aliphatic amine, each aliphatic radical containing from 1 to 12 carbon atoms.

6. The process of claim 4, wherein said tertiary amine is triethylamine.

References Cited in the file of this patent

Grimmel et al.; J. Am. Chem. Soc., 68, 539–542 (1946).